United States Patent
Fiala et al.

(10) Patent No.: US 12,423,752 B2
(45) Date of Patent: Sep. 23, 2025

(54) SYSTEM AND METHOD FOR INCOME MANAGED ACCOUNT

(71) Applicant: Edward Jones & Co., St. Louis, MO (US)

(72) Inventors: William Elliott Fiala, Creve Coeur, MO (US); Matthew James Mikula, St. Louis, MO (US)

(73) Assignee: Edward Jones & Co., St. Louis, MO (US)

( * ) Notice: Subject to any disclaimer, the term of this patent is extended or adjusted under 35 U.S.C. 154(b) by 0 days.

(21) Appl. No.: 13/724,691

(22) Filed: Dec. 21, 2012

(65) Prior Publication Data
US 2014/0180962 A1  Jun. 26, 2014

(51) Int. Cl.
*G06Q 40/06* (2012.01)

(52) U.S. Cl.
CPC .................... *G06Q 40/06* (2013.01)

(58) Field of Classification Search
CPC ....................................................... G06Q 40/06
USPC ..................................................... 705/35–45
See application file for complete search history.

(56) References Cited

U.S. PATENT DOCUMENTS

| | | |
|---|---|---|
| 5,608,620 A | 3/1997 | Lundgren |
| 5,644,727 A | 7/1997 | Atkins |
| 5,884,287 A | 3/1999 | Edesess |
| 5,893,079 A | 4/1999 | Cwenar |
| 5,911,136 A | 6/1999 | Atkins |
| 5,987,433 A * | 11/1999 | Crapo ............ G06Q 40/04 705/36 R |
| 5,999,918 A | 12/1999 | Williams et al. |
| 6,021,397 A | 2/2000 | Jones et al. |
| 6,061,663 A | 5/2000 | Bloom et al. |
| 6,161,098 A | 12/2000 | Wallman |
| 6,321,212 B1 | 11/2001 | Lange |
| 6,360,210 B1 | 3/2002 | Wallman |
| 6,484,152 B1 | 11/2002 | Robinson |
| 6,839,686 B1 | 1/2005 | Galant |
| 7,340,425 B2 | 3/2008 | Boyle et al. |
| 7,373,324 B1 | 5/2008 | Engin et al. |

(Continued)

FOREIGN PATENT DOCUMENTS

| | | |
|---|---|---|
| JP | 2005-141694 A | 6/2005 |
| WO | 1999/56192 A2 | 11/1999 |

(Continued)

OTHER PUBLICATIONS

Social Security Administration, "When to Start Receiving Retirement Benefits," SSA Publication No. 05-10147, Aug. 2012, 2pgs. www.socialsecurity.gov.

(Continued)

*Primary Examiner* — Robert R Niquette
(74) *Attorney, Agent, or Firm* — Duane Morris LLP

(57) ABSTRACT

A system and method for managing a consolidated account which consolidates the cash flows of a plurality of different accounts and outside income, tracks the cash flows, monitors the sustainability of income streams and expense needs, makes projections for further potential cash flows, has the ability to make variable distributions, tracks the current and projected balance in the income managed account and issues alerts when account parameters fail to meet a criteria, and automatically takes corrective action or makes recommendations.

18 Claims, 6 Drawing Sheets

(56) References Cited

U.S. PATENT DOCUMENTS

| | | | |
|---|---|---|---|
| 7,403,918 B2* | 7/2008 | Kochansky | G06Q 40/00 705/37 |
| 7,512,555 B2 | 3/2009 | Finn | |
| 7,577,597 B1 | 8/2009 | Allison et al. | |
| 7,672,890 B2 | 3/2010 | Hernandez | |
| 7,899,750 B1* | 3/2011 | Klieman | G06Q 40/02 705/40 |
| 8,050,995 B1* | 11/2011 | Landry | G06Q 30/0216 705/14.18 |
| 2001/0037289 A1 | 11/2001 | Mayr et al. | |
| 2002/0038273 A1 | 3/2002 | Wherry et al. | |
| 2002/0143680 A1 | 10/2002 | Walters et al. | |
| 2002/0147671 A1 | 10/2002 | Sloan et al. | |
| 2002/0188536 A1* | 12/2002 | Milosavljevic | G06Q 40/02 705/35 |
| 2003/0093352 A1 | 5/2003 | Muralidhar et al. | |
| 2003/0208429 A1 | 11/2003 | Bennett | |
| 2003/0212621 A1 | 11/2003 | Poulter et al. | |
| 2004/0078271 A1 | 4/2004 | Morano et al. | |
| 2004/0267651 A1 | 12/2004 | Jenson et al. | |
| 2005/0273413 A1 | 12/2005 | Vaudrie | |
| 2006/0031149 A1 | 2/2006 | Lyons et al. | |
| 2006/0095351 A1* | 5/2006 | Gershenfeld | G06Q 10/02 705/35 |
| 2007/0130043 A1 | 6/2007 | O'Shaughnessy et al. | |
| 2007/0130062 A1* | 6/2007 | Huh | G06Q 20/10 705/39 |
| 2007/0192224 A1 | 8/2007 | Quayle et al. | |
| 2008/0046349 A1* | 2/2008 | Elberg | G06Q 40/02 705/35 |
| 2008/0071702 A1 | 3/2008 | Howard et al. | |
| 2008/0162373 A1 | 7/2008 | Adler et al. | |
| 2008/0294571 A1 | 11/2008 | Maloney et al. | |
| 2009/0024540 A1* | 1/2009 | Ryder | G06Q 40/00 705/36 R |
| 2009/0094170 A1* | 4/2009 | Mohn | G06Q 40/10 705/36 R |
| 2009/0248589 A1 | 10/2009 | Snyder et al. | |
| 2009/0276374 A1 | 11/2009 | Viner | |
| 2010/0131423 A1* | 5/2010 | Meyer | G06Q 40/06 705/36 R |
| 2010/0217701 A1* | 8/2010 | Mesilaty | G06Q 40/02 715/764 |

FOREIGN PATENT DOCUMENTS

| | | |
|---|---|---|
| WO | 2003/075122 A2 | 9/2003 |
| WO | 2008/135511 A1 | 11/2008 |
| WO | 2008/138065 A1 | 11/2008 |

OTHER PUBLICATIONS

Social Security Administration, "How Work Affects Your Benefits," SSA Publication No. 05-10069, Jan. 2013, 10pgs. www.socialsecurity.gov.

Social Security Administration, "Windfall Elimination Provision," SSA Publication No. 05-10045, Jan. 2013, 2pgs. www.socialsecurity.gov.

Social Security Administration, "Retirement Planner: Getting Benefits While Working," Oct. 2013, 1pg. www.ssa.gov/retire2/whileworking.htm.

Social Security Administration, "Survivors Planner: Planning for your Survivors," Oct. 2013, 2pgs. www.ssa.gov/survivorplan/onyourown.htm.

* cited by examiner

| Projected Balance Detail - Next 60 Days | | | | | |
|---|---|---|---|---|---|
| Projected Date | Sources | Description | Type ~500 | Deposits and Interest | Withdrawals and Fees | Projected Balances |
| | | Starting Balance - Nov. 1, 2011 | | | | $ 3,500.00 |
| 3-Nov-2011 | 536-09083 | BOND FUND OF AMERICA - AMERICA | Dividend | $ 400.00 | | $ 3,900.00 |
| 5-Nov-2011 | 536-09083 | ST. LOUIS COUNTY AIRPORT BOND | Interest | $ 200.00 | | $ 4,100.00 |
| 18-Nov-2011 | 536-09086 | GENERAL ELECTRIC | Dividend | $ 400.00 | | $ 4,500.00 |
| 27-Nov-2011 | 997-56550 | BANK OF AMERICA | Recurring Transfer | | $ (2,700.00) | $ 1,800.00 |
| 27-Nov-2011 | 850-96301 | Transfer in | Recurring Transfer | $ 600.00 | | $ 2,400.00 |
| 11/31/2011 | 997-56550 | INSURED BANK DEPOSIT | Interest | $ 10.00 | | $ 2,410.00 |
| 2-Dec-2011 | 997-56550 | LTC Insurance Premium | Anticipated Withdrawal | | $ (2,810.00) | $ (400.00) |
| 3-Dec-2011 | 997-56551 | APPLE | Dividend | $ 1,800.00 | | $ 1,400.00 |
| 4-Dec-2011 | 997-56552 | ??? | ??? | $ 100.00 | | $ 1,500.00 |
| 5-Dec-2011 | 997-56553 | ??? | ??? | $ 100.00 | | $ 1,600.00 |
| 6-Dec-2011 | 997-56554 | ??? | ??? | $ 100.00 | | $ 1,700.00 |
| 7-Dec-2011 | 997-56555 | ??? | ??? | $ 100.00 | | $ 1,800.00 |
| 8-Dec-2011 | 997-56556 | ??? | ??? | $ 101.00 | | $ 1,901.00 |
| 9-Dec-2011 | 997-56557 | ??? | ??? | $ 102.00 | | $ 2,003.00 |
| 10-Dec-2011 | 997-56558 | ??? | ??? | $ 103.00 | | $ 2,106.00 |
| 11-Dec-2011 | 997-56559 | ??? | ??? | $ 104.00 | | $ 2,210.00 |
| 12-Dec-2011 | 997-56560 | ??? | ??? | $ 105.00 | | $ 2,315.00 |
| 13-Dec-2011 | 997-56561 | ??? | ??? | $ 106.00 | | $ 2,421.00 |
| 14-Dec-2011 | 997-56562 | ??? | ??? | $ 107.00 | | $ 2,528.00 |
| 15-Dec-2011 | 997-56563 | ??? | ??? | $ 108.00 | | $ 2,636.00 |
| 16-Dec-2011 | 997-56564 | ??? | ??? | $ 109.00 | | $ 2,745.00 |
| etc | | | | | | |
| Totals | | | | $ 5,777.00 | $ (7,210.00) | $ 2,067.00 |

Key:
- ◆ - Account balance is projected to fall below your targeted minimum balance for the account.
- ◆ - Account balance is projected to be negative.

FIGURE 4

| Projected Withdrawal Analysis from Edward Jones Accounts next 12 Months | | | | | |
|---|---|---|---|---|---|
| 600 | | 610 | | 620 | 630 640 |
| Account | Number | Current Value | Projected Withdrawals into IMA | Other Projected Withdrawals | Total Projected | Withdrawal Rate |
| Judy and Bob Smith | xxx-xxxxxx1 | $ 105,123.00 | $ 6,000.00 | $ - | $ 6,000.00 | 5.7% |
| Judy Smith | xxx-xxxxxx2 | 185,008.00 | 5,600.00 | $ 6,000.00 | $ 11,600.00 | 6.3% |
| Bob Smith | xxx-9xxxxx1 | 85,300.00 | 4,000.00 | $ - | $ 4,000.00 | 4.7% |
| Bob Smith-Annuity | | 30,654.00 | $ - | $ - | $ - | 0.0% |
| | | $ 445,085.00 | $ 17,600.00 | $ 6,000.00 | $ 23,600.00 | 5.3% |

Figure 5

SYSTEM AND METHOD FOR INCOME MANAGED ACCOUNT

The present application claims the priority U.S. Provisional Patent Appn. Ser. No. 61/581,417 filed Dec. 29, 2011, the disclosure of which is hereby incorporated by reference.

The present disclosure is directed to the monitoring, managing and consolidation of income and investments from several sources and the controlled distribution of assets from consolidated accounts.

It is known to use unified managed accounts or cash management accounts to consolidate and manage the assets in a variety of accounts. Most of these known consolidated accounts are used to track the acquisition of investments. In some cases, an investment portfolio may have a planned allocation among a plurality of assets in several different accounts, or consolidate and manage the income and cash flow from the assets associated with various accounts including income from outside sources including Social Security, annuities and pensions. The holdings of the accounts are tracked and rebalancing can occur when the accounts exceed some predetermined threshold from a desired goal.

Orderly distribution of assets from such a consolidated account has been problematic, particularly when the owner of the consolidated account wishes to receive a fixed cash flow stream from a plurality of non-cash accounts. For example, an individual may own a mutual fund account, a stock account, a bond fund and/or a retirement account comprising one or more types of assets. In addition the consolidated account may receive a cash flow from a money market account, certificate of deposit, annuity or other cash equivalent. The stock account may pay a quarterly dividend, and the bond account may pay a distribution semi-annually. Notwithstanding the variability of the earnings of the consolidated account, the individual may wish to withdraw assets from the account in a fixed manner. In order to determine the amount of cash available to distribute to the individual on a monthly basis, the financial advisor typically determined the amount of income expected to be earned from the assets over the year, divided that number by twelve, and used this resultant number as the fixed amount distribution available each month. However, such a coarse determination does not take into account the actual balance of cash available to pay the fixed amount through the course of the year. This can be even more difficult when the owner is receiving cash flow from outside non-investment sources like Social Security, a pension, etc., as it becomes more challenging to monitor and track the cash flows from a variety of sources to see how much the owner is actually receiving and spending month to month. For example, predicting the cash flow can be problematic in that dividends are not guaranteed and can increase or decrease, bonds can default or have varying interest rates and annuities can vary or end altogether. Thus, this prior art method does not take into account the variability of the cash flow in the consolidated account. This prior art method also does not take into account that certain assets may be better utilized to generate the cash flow from an after-tax perspective, either due to the nature of the cash flow or due to the cash basis of the assets, or due to an overweight/underweight in the asset relative to the overall asset allocation.

The need for accurately managing cash balance and cash flow from accounts used for retirement is particularly critical as the account holder is probably no longer in the asset acquisition phase of their life, and thus their lifestyle needs to be maintained using an asset base that is drawn down overtime.

Thus, there is a need for an income managed account which consolidates the cash flows of a plurality of different accounts and outside income, tracks the cash flows, monitors the sustainability of income streams and expense needs, makes projections for further potential cash flows, has the ability to make variable distributions, tracks the current and projected balance in the income managed account and issues alerts when account parameters fail to meet a criteria, and automatically takes corrective action or makes recommendations on which assets/accounts to be used to generate cash flow from a tax efficient perspective.

BRIEF DESCRIPTION OF THE DRAWINGS

FIG. 4 is a simplified illustration of a projected balance of an income managed account using one embodiment of the present disclosure.

FIG. 5 is a simplified pictorial representation of a projected withdrawal analysis of using one embodiment of the present disclosure.

DETAILED DESCRIPTION

Figure 1:
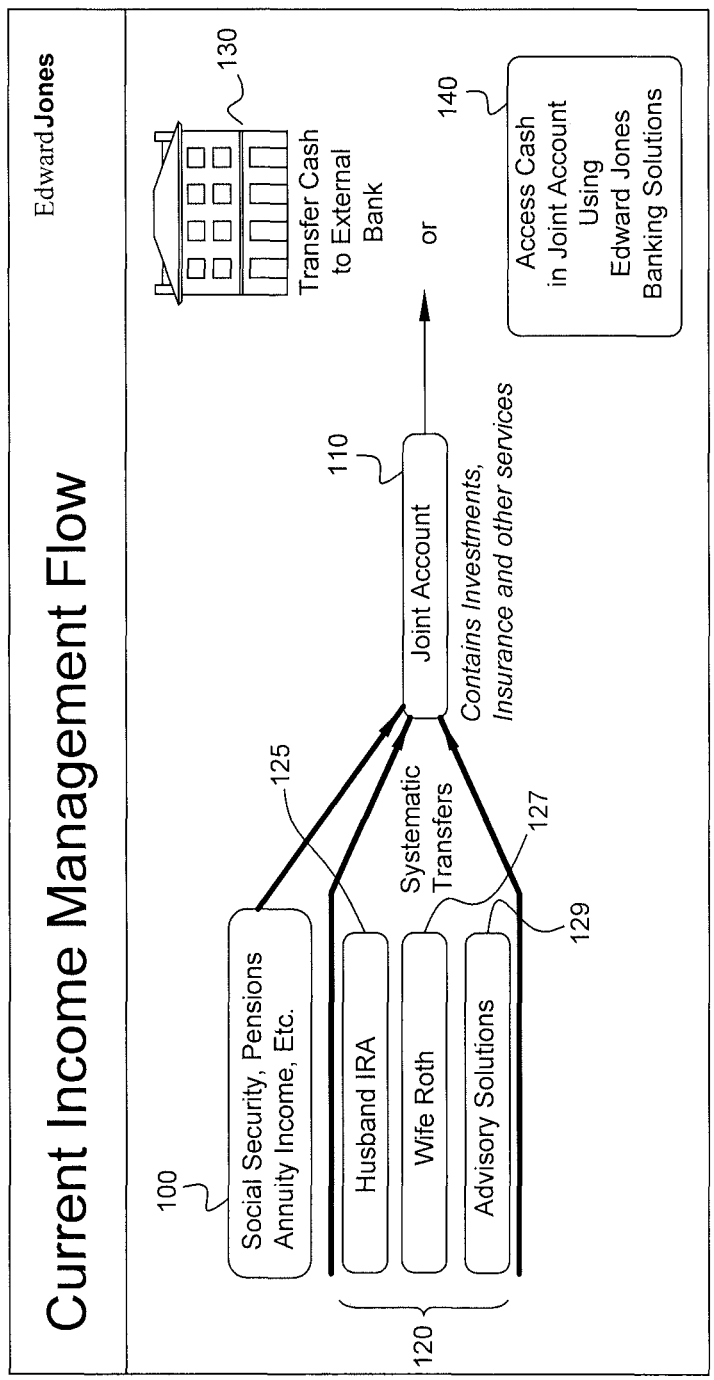
FIG. 1 is a simplified flow diagram showing a prior art income management flow.

FIG. 1 illustrates a prior art system used to manage income for a couple's retirement accounts. Income in the form of social security payments, pensions and annuity income and other cash income 100 are deposited in a joint account 110 of a couple. The couple may also maintain brokerage accounts 120 that may manage the husband's individual retirement account (IRA) 125, the wife's Roth account 127 and other retirement accounts 129, each of which may deposit withdrawals and distributions to the joint account 110. The cash deposited in the joint account can be transferred to an external bank 130 or can be accessed or withdrawn by the holders of the account 140. In prior art systems, it is difficult to predict the amount of income derived from the retirement accounts 100, 120, such that they met the demands of the withdrawal for the joint account 110. In addition, while interest and dividends from non-IRA accounts have been accounted for in prior art systems, deposits from IRA dividends and interest have not been accounted for.

Management of cash flow using the prior art methods is typically a manual endeavor. For example, the $300,000 retirement account of an individual may include 25% in short-intermediate investments, 25% in intermediate-long investments and 50% in rising income-growth investments. In order to determine the amount of fixed payments that would be available on a monthly basis for an individual, a financial advisor would estimate the amount of income that would be generated annually for the investments. For example short-intermediate investments may be predicted to generate $3,395 annually, intermediate-long investments may generate $4,190 annually, and rising income and growth investments may generate $5,330 annually. Thus the cumulative income for the investment accounts would be $13,635, which supports a monthly fixed withdrawal of $1,136 for use by the individual. However, one problem is that the income derived from the investments may not be monthly and may not coincide with the monthly withdrawals. For example, a bond fund may only pay a dividend every six months. Thus, the financial advisor may need to liquidate some of the assets in order to provide a fixed monthly income. However, if assets are liquidated, the predicted income from the investments may be affected, and thus the financial advisor may get involved in a vicious cycle of attempting to predict income earned, estimating income available for withdrawal and liquidating assets to meet any shortfall. Additionally, the financial advisor may need to systematically liquidate assets in the normal course of business to supplement the income that is not provided through normal dividends and interest. Furthermore, as the assets are liquidated, there may become a time when the balance has declined so much that they can no longer provide the necessary cash flow from the systematic withdrawal.

Figure 2:
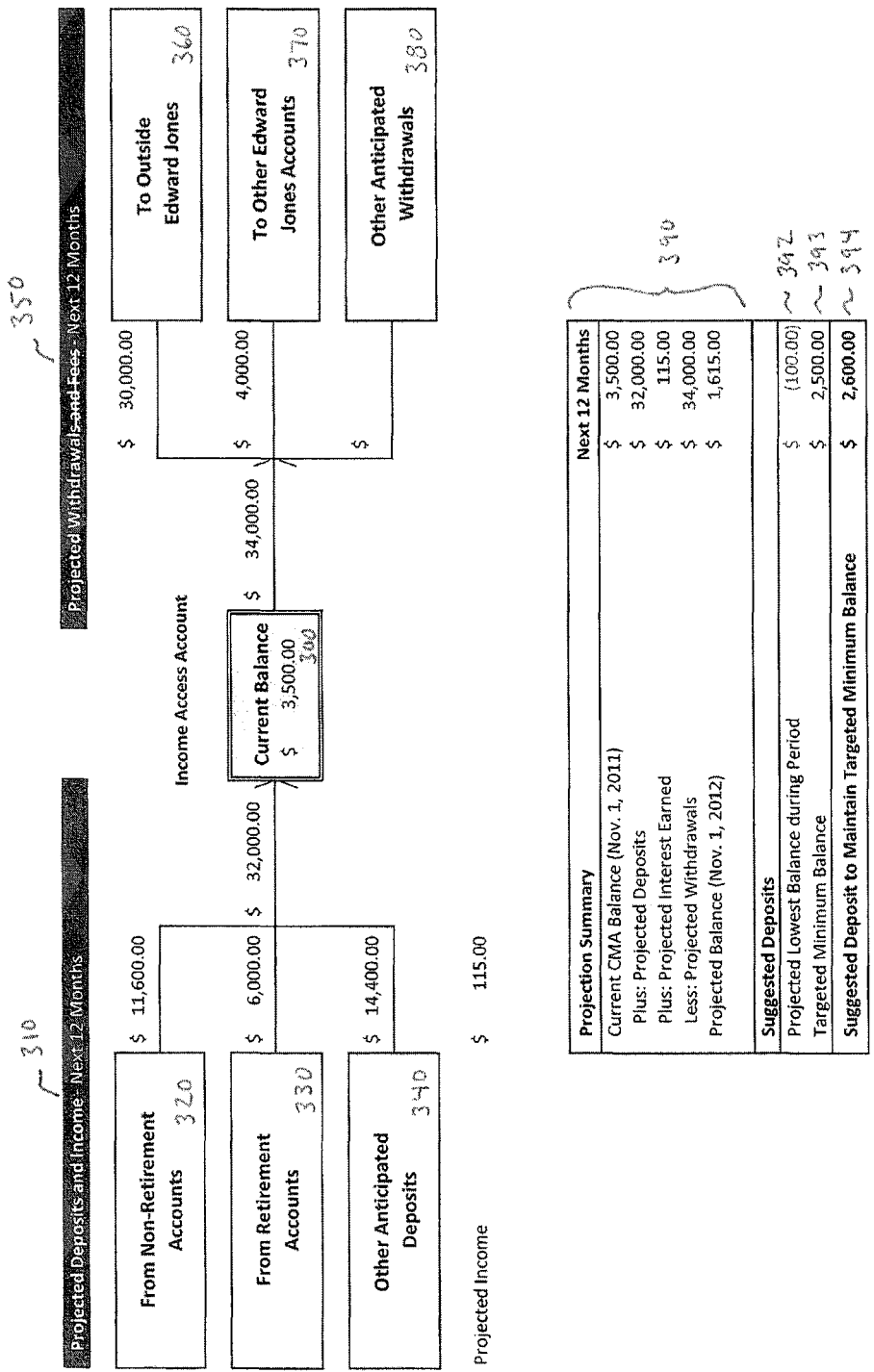
FIG. 2 is a simplified pictorial representation of one embodiment of the present disclosure.

FIG. 2 illustrates one embodiment of the present disclosure which obviates the deficiencies identified in the prior art systems. Income managed account 300 is used to manage the deposits and income derived from other accounts, and the withdrawals of cash and transfers to other accounts. The projected income and deposits 310 into the IMA 300 are determined for a predetermined period of time. In the embodiment of FIG. 2, the predetermined period of time is 12 months. However the predetermined period of time may correspond to a longer or shorter time period. For example, an analysis of the projections may be run annually, and monthly thereafter for the same initial 12 month period. Or the analysis may be performed upon the occurrence of some event which may change the planning horizon. The projected deposits and income 310 may include non-retirement accounts 320, retirement accounts 330 and other anticipated deposits 340. While prior art methods only considered income from non-IRA accounts, the present disclosure includes dividend and interest from both IRA and non-IRA accounts. The projected withdrawals 350 from the IMA 300 can also be projected for the same predetermined time period. The projected withdrawals 350 from the IMA 300 may include transfers to accounts outside 360 the manager of the IMA 300, transfers to other accounts 370 managed by the manager of the IMA 300 and other anticipated withdrawals 380.

In one embodiment, a summary of the projected deposits and income into the IMA 300, and the projected withdrawals can be used to determine the projected balance of the IMA at the end of the predetermined period 390, effectively monitoring the short term liquidity. In addition, the projected balance of the account can be predicted at any point during the predetermined period by taking into account the timing of the projected deposits and withdrawals 392. The predicted projected balance of the account can be compared to a targeted minimum balance 393 to determine a suggested deposit to maintain the targeted minimum balance 394 of the account 300 for the entire predetermined period. In another embodiment, the predicted projected balance of the account can be compared to a targeted maximum balance to determine a suggested withdrawal to maintain the targeted maximum balance of the account 300 for the entire predetermined period.

In one embodiment, the projected balance can be linked to financial planning tools to allow a comprehensive analysis of the effect of actual deposits and withdrawals as compared to the predicted deposits and withdrawals in order to monitor the long term sustainability of the targeted cash flow. In another embodiment, the present disclosure can allow access by a financial advisor or the account holder through Internet access. The present disclosure can also provide a budgeting tool to allow ad hoc adjustments to the amount and timing of withdrawals from the consolidated account. If the amount of withdrawal exceeds a predetermined threshold, an alert can be issued to identify to the financial advisor or account holder of the impact of the withdrawal. In another embodiment, the present disclosure could help identify which assets may be targeted to generate cash flow from a tax efficient perspective. In another embodiment, an alert can be generated if the source of cash flow from a systematic withdrawal can no longer provide the desired amount of cash flow.

In one embodiment, the present disclosure can take into account the impact of mandatory Required Minimum Distributions (RMDs). RMDs generally are minimum amounts that a retirement plan account owner must withdraw annually starting at a specified age. Failure to take the RMDs can subject the plan owner to stiff penalties for failure to take RMDs. Thus, the specific rules governing RMDs can be taken into account in predicting the projected balance of the consolidated or joint account in order to manage the amount and distribution of assets to an account holder.

The consolidated account may also accommodate inputs from accounts managed by third party providers. For example, the consolidated account may be linked to an account that automatically provides annuity deposits of income, Social Security payments, or pension distributions into the consolidated account.

Figure 3:
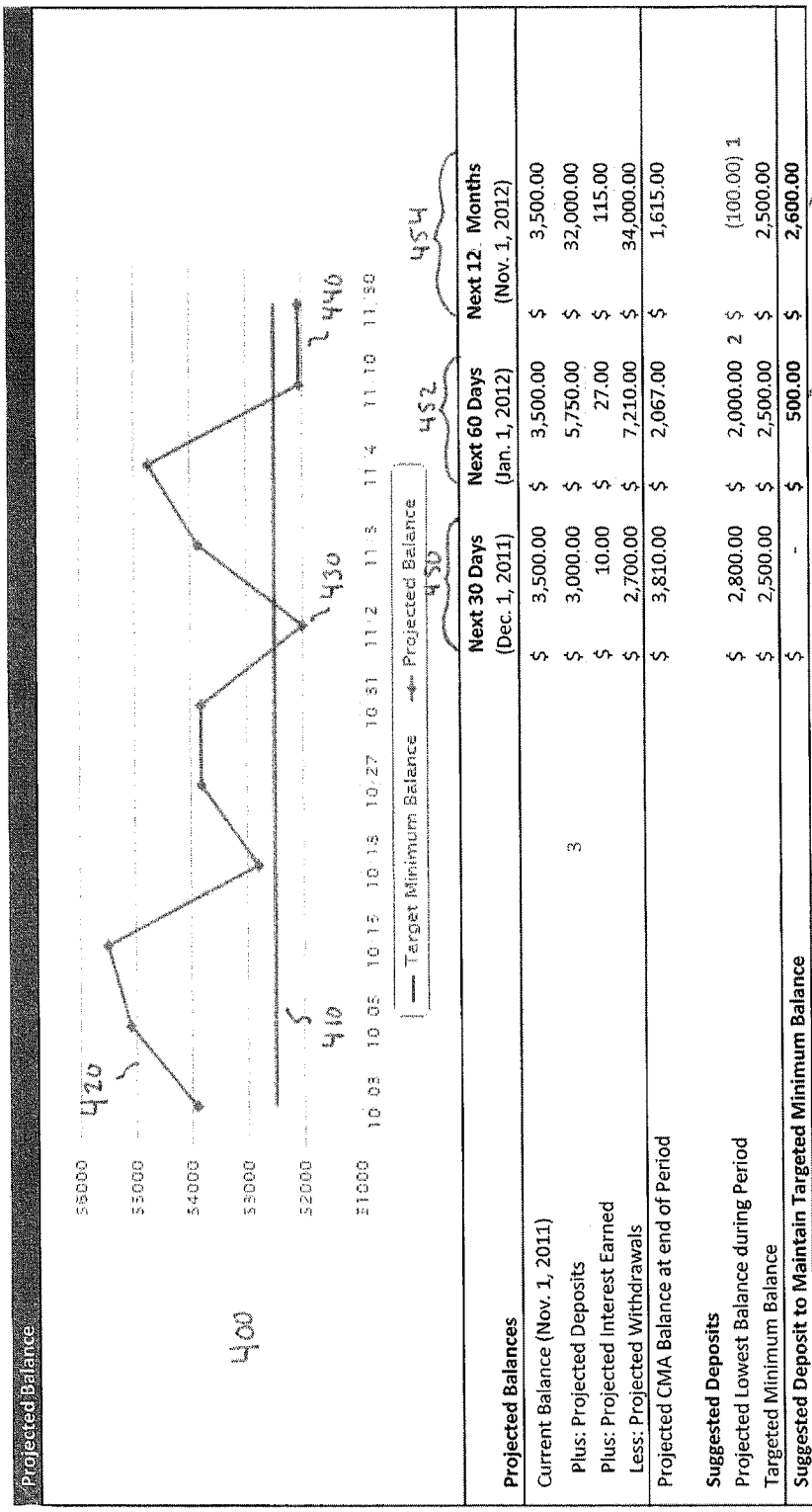
FIG. 3 is a simplified graphical representation of one embodiment of the present disclosure.

FIG. 3 illustrates the use of the projected balance and the target minimum balance of the IMA 300 to manage the account. A graphical representation 400 of the target minimum balance 410 and the projected balance 420 of the consolidated account for a portion of the predetermined period can be used to identify when, and by how much the projected balance falls below the target minimum balance 430, 440. The projected balance of the IMA 300 can also be viewed over multiple predetermined periods 450, 452 454. Alerts can be generated based on predetermined parameters associated with the IMA. For example, an alert can be generated based on projected deposits 460 or projected balance 462,464.

Alerts can be used to notify the financial advisor and the account holder and identify suggested solutions. In one embodiment, an alert can provide a suggested deposit to maintain a targeted minimum balance during a predetermined period 470,472. In another embodiment, an alert can be used to trigger some corrective action automatically. For example, a pre-designated asset for an account can be liquidated and transferred to the IMA at the appropriate time to ensure the IMA balance stays above the targeted minimum balance. In another embodiment, assets can be identified in priority order for liquidation for predetermined amounts in order to maintain the balance in the IMA as designated by the account holder. The identified assets can be liquidated automatically at the appropriate time, or a notification of suggested liquidation can be delivered to the financial advisor or account holder A rules engine can be used in conjunction with the assets identified for liquidation to take into account tax treatment, restrictions of liquidation of assets, minimum and maximum amounts, asset allocation, etc. The risk engine can recommend different actions based on account holder preference such as risk tolerance, account size or other variable. The risk engine can suggest other solutions such as a reduction in cash flow withdrawals, which can result from a decrease in income from declining market values, a reduction in outside income, or an increase in expenses.

FIG. 4 illustrates a detailed projected balance for an IMA. The detailed projected balance may be made available through a pull down menu, or may be accessed through drill down technology from a display as shown in FIG. 3. The detailed projected balance can identify on a transaction by transaction basis 500, the projected balance 510 of the IMA. In one embodiment, alerts can be identified if the IMA account fails to satisfy predetermined account parameters. For example, on Nov. 27, 2011, an alert 520 is generated that identifies that the IMA account balance is projected to fall below the targeted minimum balance. The alert also identifies the specific transaction associated with the predetermined account parameter not being satisfied. For example, the alert on November 27 may be attributable to the transfer out of $2,700 from the IMA and transfer in of $600 to the IMA. In one embodiment, the alert can trigger automatic action to increase the deposit into the account, or to decrease the amount transfer from the account. The automatic corrective action can be based on a set of predetermined criteria set by the account holder. For example, the account holder may designate that transfer from the IMA account should never be reduced, and instead, the deposit into the IMA account should be increased. The account holder may also designate which retirement accounts can be used to make deposits to the IMA, or can designate the type of asset, e.g., mutual funds, stocks, etc. In another embodiment, the account holder may prioritize which accounts to draw deposits from, and those accounts can be identified in response to an alert or action may automatically be taken. In yet another embodiment, the asset to be liquidated can be prioritized automatically as a function of a specified criteria such as minimize tax consequences, minimize losses, maximize gains, maintain target asset allocation, etc.

Note that the predetermined period is selectable, and thus an alert may issue even though the account criteria that is predicted to not be satisfied may be months away. The earlier that an alert is identified, the more time is available to take corrective action. However, in some circumstances, corrective action may be purposefully delayed until closer to the alert event to monitor the effects of the deposits from the variable income accounts which may obviate the alert. Thus, in one embodiment, a selectable window can identified within which to take corrective action prior to the account parameter failing to satisfy some criteria.

In another embodiment, different type of alerts can identify different responses. For example, on Dec. 2, 2011, an alert may be issued that the IMA account balance is projected to be negative 530. The corrective action for a negative account balance can be selected to be different than the corrective action for an account balance that is projected to fall below a targeted minimum balance. In another embodiment, corrective action can have selectable parameters. For example, selectable parameters can identify the corrective action which corrects the greatest number of alerts, or results in the least amount of transactions, or requires the least amount of liquidations.

FIG. 5 illustrates a projected withdrawal analysis to help manage the withdrawal of cash from the account holder's retirement or other income accounts 600. The analysis may incorporate withdrawals from the income accounts 600 into the IMA account 610 as well as other withdrawals 620. The total withdrawals 630 can be used to determine a withdrawal rate 640 for a predetermined period which is helpful in determining whether the assets are being sufficiently maintained and appropriate for the account holder. For example, if the withdrawal rate is above a certain targeted amount, it may help suggest that corrective action may need to be taken to moderate withdrawals.

Thus, use of the present disclosure greatly simplifies and more accurately manages the ability of an account holder to be provided with a desired periodic distribution from a plurality of accounts that provide a variable income stream. The predictive nature of managing a cash balance and cash flow to provide a desired amount periodically is necessary to ensure that sufficient assets are available during the lifetime of the account holder and is not possible with prior art systems and methods. The present disclosure is implemented in a general purpose processor specifically programmed to perform the methods described herein, which are not capable of being performed using pen or paper. The account information may be maintained in databases and the display and input of information can be through graphical user interfaces.

Figure 6:
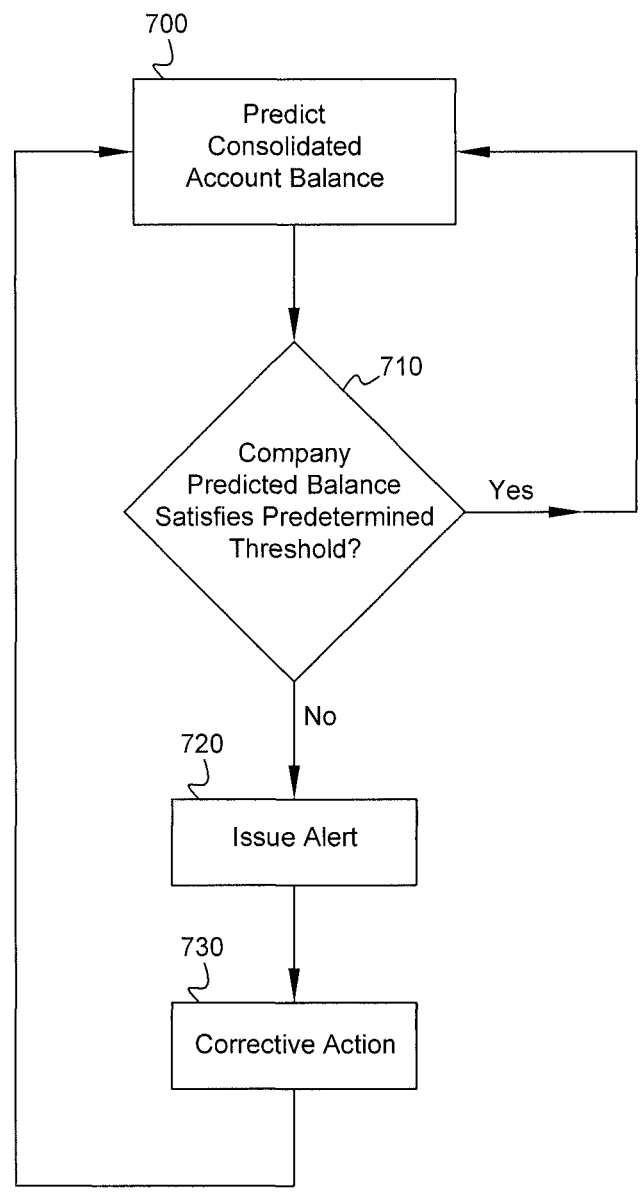
FIG. 6 is a simplified flow diagram of one embodiment of the present disclosure.

FIG. 6 illustrates one embodiment of an implementation of the present disclosure for managing a consolidated account. The consolidated account can include a first account of non-cash assets and a second account of non-cash assets, the second account being different than the first account. The first and second accounts can be provided by the same institution providing the consolidated account, or all three accounts can reside at different institutions. The consolidated account can also include a cash account. The cash account may be a checking account or a savings account and include income in the form of social security payments, pensions and annuities. The non-cash accounts may be brokerage accounts that may manage the individual retirement accounts (IRA) and income from IRA dividends and interest may be deposited into the consolidated accounts.

In step 700, the consolidated account balance can be predicted over a period of time. The predicting takes into account the deposits into the consolidated account including the amount and timing of income to be earned from the assets of the first and second account. It also includes predicting the amount and timing of withdrawals from the consolidated account. The step of predicting can be performed over a selectable planning horizon, for example a tax year. However the predetermined period of time may correspond to a longer or shorter time period. For example, the prediction may be run annually, and monthly thereafter for the same initial 12 month period. Or the prediction may be performed upon the occurrence of some event which may change the planning horizon. Thus, the projected balance of the consolidated account be predicted at any point during the predetermined period by taking into account the timing of the projected deposits and withdrawals In step 710, the predicted balance of the consolidated account can be compared with a predetermined criteria. In step 720, if the predicted account balance is more or less than the predetermined criteria, an alert can be issued The predetermined criteria can be a targeted minimum balance for the consolidated account, a negative account balance, or any other account criteria. The alert may identify the specific condition which caused the alert as well as the specific transaction associated with the predetermined account parameter not being satisfied. For example, the alert may identify a bond call, a dividend cut, a systematic withdrawal issue, or other previously unplanned circumstance.

In step 730, the alert can trigger automatic corrective action to increase the deposit into the consolidated account, or to decrease the amount transferred from the consolidated account. The automatic corrective action can be based on a set of predetermined criteria. For example, the corrective action can include identifying a list of the plurality of accounts in a priority order in which to liquidate assets to thereby increase the predicted balance of the consolidated account to satisfy the predetermined threshold. The prioritized list may designate the type of accounts can be used in priority order to make deposits to the consolidated account, or can designate the type of asset, e.g., mutual funds, stocks, etc. taking into account a specified criteria such as minimizing tax consequences, minimize losses, maximize gains, etc. Once the corrective action has been taken, the normal prediction cycle can continue.

The present disclosure can be implemented by a general purpose computer programmed in accordance with the principals discussed herein. It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine-readable storage substrate, a memory device, or a combination of one or more of them.

The term "processor" encompasses all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, app, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network or as an app on a mobile device such as a tablet, PDA or phone.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer or mobile device. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms data memory including non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) monitor or other monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Those skilled in the art will appreciate that the present invention can be practiced by other than the described embodiments, which are presented for the purposes of illustration and not of limitation, and the present invention is limited only by the claims which follow.

What is claimed:

1. A method of managing a consolidated account, comprising the steps of:
   (a) providing a first account of first non-cash assets with a first current account value, the first non-cash assets generating income, and including at least one cash flow asset producing an income stream, a liquidation of the at least one cash flow asset causing the income stream to decline;
   (b) providing a second account of second non-cash assets with a second current account value, the second account being different than the first account;
   (b1) providing a total current value, the total current value including a summation of the first current account value and the second account value;
   (c) using a processor, predicting the account balance of a consolidated account associated with a plurality of accounts, including the first and second account as a function of time and balance amount, including the steps of:
      (i) predicting the amount and timing of income to be earned from the assets of the first account, based in part on an income portion of the income stream, to be deposited into the consolidated account;
      (ii) predicting the amount and timing of income to be earned from the assets of the second account to be deposited into the consolidated account; and
      (iii) predicting the amount and timing of withdrawals from the consolidated account;
   (d) using the processor, comparing the predicted balance of the consolidated account with a predetermined criteria, and if the predicted account balance is less than the predetermined criteria:
      (i) identifying the time at which the predicted account balance of the consolidated account is less than the predetermined criteria;
      (ii) identifying a list of potential transactions for the plurality of accounts in which to liquidate assets to thereby increase the predicted balance of the consolidated account to satisfy the predetermined criteria within a selectable window of time before the identified time at which the predicted account balance of the consolidated account is less than the predetermined criteria;
      (iii) for each potential transaction, performing step (c) above and comparing the predicted balance of the consolidated account with the predetermined criteria and discarding a potential transaction if the predicted account balance is less than the predetermined criteria;
      (iv) for the potential transactions that have not been discarded, ranking the list of potential transactions for the plurality of accounts in a priority order, the priority order based in part on a specified mathematical optimization criteria of the total current value;
   (e) displaying, on a graphical user interface of a display device, a graphical representation of the predicted account balance and the predetermined criteria over a first time period in a first region of the graphical user interface and a numerical representation of the predicted account balance over one or more additional time periods in a second region of the graphical user interface;
   (f) using the processor, generating one or more alerts if the predicted account balance is less than the predetermined criteria, wherein the one or more alerts identify when the account balance is predicted to become less than the predetermined criteria; and
   (g) if one or more alerts are generated, displaying, on the graphical user interface of the display device, the one or more alerts in a third region of the graphical user interface.

2. The method of claim 1, further comprising the step of:
   (h) liquidating assets from the plurality of accounts in the identified priority order and depositing the income derived therefrom in the consolidated account to thereby increase the predicted balance of the consolidated account to satisfy the predetermined criteria.

3. The method of claim 2, wherein the step of liquidating occurs at any time within the selectable window of time.

4. The method of claim 1, wherein the predetermined criteria comprise a minimum account balance.

5. The method of claim 1, wherein the list of potential transactions is prioritized as a function of at least one of: tax consequences, asset allocation, and available balance associated with liquidating assets of the plurality of accounts.

6. The method of claim 1, wherein the balance of the consolidated account is predicted for a period of twelve months.

7. The method of claim 1, wherein the timing of the deposits of income from the first and second account is not the same.

8. The method of claim 1, wherein the steps (c)-(d) are performed periodically.

9. The method of claim 8, wherein the steps (c)-(d) are performed monthly.

10. The method of claim 8, wherein the steps are performed when income is deposited in to the consolidated account.

11. The method of claim 1, wherein the step of predicting the amount and timing of income to be earned from the assets of the first account to be deposited into the consolidated account includes income from at least one of Social Security, an annuity or a pension.

12. A method of managing a consolidated account, comprising the steps of:
   (a) using a processor, predicting the account balance of a consolidated account associated with a plurality of accounts for a predetermined period of time, wherein the plurality of accounts includes a first account of first non-cash assets with a first current account value, the first non-cash assets generating income, and including at least one cash flow asset producing an income stream, a liquidation of the at least one cash flow asset causing the income stream to decline, and second account of second non-cash assets with a second current account value, and a total current value including a summation of the first current account value and the second account value, including the steps of:
      (i) predicting the amount and timing of income to be earned from the assets of the first account, based in part on an income portion of the income stream, to be deposited into the consolidated account;
      (ii) predicting the amount and timing of income to be earned from the assets of the second account to be deposited into the consolidated account; and
      (iii) predicting the amount and timing of withdrawals from the consolidated account;
   (b) using the processor, comparing the predicted balance of the consolidated account with a predetermined criteria, and if the predicted account balance is less than the predetermined criteria;
      (i) identifying a time at which the predicted account balance of the consolidated account is less than the predetermined criteria;
      (ii) identifying a list of potential transactions for the plurality of accounts in which to liquidate assets to thereby increase the predicted balance of the consolidated account to satisfy the predetermined criteria within a selectable window of time before the identified time at which the predicted account balance of the consolidated account is less than the predetermined criteria;
      (iii) for each potential transaction, performing step (a) above and comparing the predicted balance of the consolidated account with the predetermined criteria and discarding a potential transaction if the predicted account balance is less than the predetermined criteria;
      (iv) for the potential transactions that have not been discarded, ranking the list of potential transactions for the plurality of accounts in a priority order, the priority order based in part on a specified optimization criteria of the total current value;
   (c) displaying, on a graphical user interface of a display device, a graphical representation of the predicted account balance and the predetermined criteria over a first time period in a first region of the graphical user interface and a numerical representation of the predicted account balance over one or more additional time periods in a second region of the graphical user interface;
   (d) using the processor, generating one or more alerts if the predicted account balance is less than the predetermined criteria, wherein the one or more alerts identify when the account balance is predicted to become less than the predetermined criteria;
   (e) if one or more alerts are generated, displaying, on the graphical user interface of the display device, the one or more alerts in a third region of the graphical user interface; and
   (f) liquidating assets from the plurality of accounts in the identified priority order and depositing the income derived therefrom in the consolidated account to thereby increase the predicted balance of the consolidated account to satisfy the predetermined criteria.

13. The method of claim 12, wherein the step of liquidating occurs within the selectable window of time.

14. The method of claim 12, wherein the predetermined criteria comprise a minimum account balance.

15. A system for managing a consolidated account, comprising:
   a memory for storing computer readable code; and
   a processor operatively coupled to the memory, the processor configured to:
   (a) predict the account balance of a consolidated account associated with a plurality of accounts for a predetermined period of time, wherein the plurality of accounts includes a first account of first non-cash assets with a first current account value, the first non-cash assets generating income, and including at least one cash flow asset producing an income stream, a liquidation of the at least one cash flow asset causing the income stream to decline, and second account of second non-cash assets with a second current account value, and a total current value including a summation of the first current account value and the second account value, including configured to:
      (i) predict the amount and timing of income to be earned from the assets of the first account, based in part on an income portion of the income stream, to be deposited into the consolidated account;
      (ii) predict the amount and timing of income to be earned from the assets of the second account to be deposited into the consolidated account; and
      (iii) predict the amount and timing of withdrawals from the consolidated account;
   (b) compare the predicted balance of the consolidated account with a predetermined criteria, and if the predicted account balance is less than the predetermined criteria:
      (i) identify a time at which the predicted account balance of the consolidated account is less than the predetermined criteria;
      (ii) identify a list of potential transactions for the plurality of accounts in which to liquidate assets to thereby increase the predicted balance of the consolidated account to satisfy the predetermined criteria within a selectable window of time before the identified time at which the predicted account balance of the consolidated account is less than the predetermined criteria;
      (iii) for each potential transaction, perform (a) above and compare the predicted balance of the consolidated account with the predetermined criteria and discard a potential transaction if the predicted account balance is less than the predetermined criteria;

(iv) for the potential transactions that have not been discarded, rank the list of potential transactions for the plurality of accounts in a priority order, the priority order based in part on a specified optimization criteria of the total current value; and (c) display, on a graphical user interface of a display device, a graphical representation of the predicted account balance and the predetermined criteria over a first time period in a first region of the graphical user interface and a numerical representation of the predicted account balance over one or more additional time periods in a second region of the graphical user interface;

(d) generating one or more alerts if the predicted account balance is less than the predetermined criteria, wherein the one or more alerts identify when the account balance is predicted to become less than the predetermined criteria;

(e) if one or more alerts are generated, display, on the graphical user interface of the display device, the one or more alerts in a third region of the graphical user interface (f) liquidate assets from the plurality of accounts in the identified priority order and depositing the income derived therefrom in the consolidated account to thereby increase the predicted balance of the consolidated account to satisfy the predetermined criteria.

16. The system of claim 15, wherein the processor is configured to liquidate assets within the selectable window of time.

17. The system of claim 15, wherein the predetermined criteria comprise a minimum account balance.

18. The method of claim 1, further comprising:

(h) allowing analysis of actual deposits as compared to projected deposits, the actual deposits corresponding to an amount of income to earned from the assets of the first account and the second account earned at a point in time;

(i) generating one or more actual cash flow alerts if the actual deposits can no longer provide an actual amount and timing of income matching a predicted point-in-time amount of income to be earned from the assets of the first account and the second account.

* * * * *